(12) United States Patent
Buil et al.

(10) Patent No.: US 10,972,403 B2
(45) Date of Patent: Apr. 6, 2021

(54) STORAGE FAST PATH

(71) Applicant: Telefonaktiebolaget LM Ericsson (publ), Stockholm (SE)

(72) Inventors: Manuel Buil, Aachen (DE); Daniel Catrein, Würselen (DE); Georg Kunz, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 403 days.

(21) Appl. No.: 15/542,571

(22) PCT Filed: Jan. 15, 2015

(86) PCT No.: PCT/EP2015/050650
§ 371 (c)(1),
(2) Date: Jul. 10, 2017

(87) PCT Pub. No.: WO2016/112979
PCT Pub. Date: Jul. 21, 2016

(65) Prior Publication Data
US 2017/0359270 A1    Dec. 14, 2017

(51) Int. Cl.
*G06F 13/00* (2006.01)
*H04L 12/911* (2013.01)
(Continued)

(52) U.S. Cl.
CPC .......... *H04L 47/70* (2013.01); *G06F 9/45558* (2013.01); *H04L 67/1097* (2013.01); *G06F 2009/4557* (2013.01)

(58) Field of Classification Search
CPC . H04L 47/70; H04L 67/1097; G06F 9/45558; G06F 2009/4557; G06F 3/0662; G06F 11/203
(Continued)

(56) References Cited

U.S. PATENT DOCUMENTS 8,429,675 B1 * 4/2013 Radhakrishnan ... G06F 9/45533
                                                              719/319
9,201,697 B2 * 12/2015 Ashok .................. G06F 9/4856
(Continued)

FOREIGN PATENT DOCUMENTS

WO    2014009160 A1    1/2014

OTHER PUBLICATIONS

Razavi et al. "Scalable Virtual Machine Deployment Using VM Image Caches"; International Conference for High Performance Computing, Networking, Storage and Analysis (SC), ACM; Nov. 17-21, 2013; Denver, CO; pp. 1-12.
(Continued)

*Primary Examiner* — Kenneth R Coulter
(74) *Attorney, Agent, or Firm* — Patent Portfolio Builders, PLLC

(57) ABSTRACT

Method for controlling first and second resources in a system including first and second components managing the first and second resources, respectively and at least one host hosting the second resource in a cloud environment, one of the first and second components comprises a compute component and the other comprises a storage component, one of the first and second resources is a compute resource and the other is a storage resource, the method comprising: causing the first component to send an inquiry request including an inquiry relating to the second resource, to the second component; causing the second component to send an inquiry response including information on the at least one host, to the first component; causing the co-location of the first and second resources on a single host that is either the at least one host or a further host hosting the first resource, based on the inquiry response.

15 Claims, 12 Drawing Sheets

(51) Int. Cl.
*G06F 9/455* (2018.01)
*H04L 29/08* (2006.01)

(58) Field of Classification Search
USPC ......... 709/220–222, 227–229, 203, 201, 202
See application file for complete search history.

(56) References Cited

U.S. PATENT DOCUMENTS

| | | | | |
|---|---|---|---|---|
| 9,201,698 | B2* | 12/2015 | Ashok | G06F 9/5033 |
| 9,338,091 | B2* | 5/2016 | Xiao | H04L 12/6418 |
| 9,531,814 | B2* | 12/2016 | Cardona-Gonzalez | H04L 67/141 |
| 9,747,176 | B2* | 8/2017 | Oppermann | G06F 3/0617 |
| 9,794,186 | B2* | 10/2017 | Xiao | H04L 47/70 |
| 9,825,854 | B2* | 11/2017 | Xiao | H04L 45/74 |
| 10,282,222 | B2* | 5/2019 | Thakkar | G06F 9/45558 |
| 2005/0234734 | A1* | 10/2005 | Chan | G06Q 30/06 705/1.1 |
| 2013/0111471 | A1 | 5/2013 | Chandrasekaran | |
| 2013/0191827 | A1* | 7/2013 | Ashok | G06F 9/45558 718/1 |
| 2013/0232501 | A1* | 9/2013 | Ashok | G06F 9/5016 718/104 |
| 2014/0052877 | A1* | 2/2014 | Mao | H04L 61/103 709/245 |
| 2014/0180858 | A1* | 6/2014 | Chan | G06Q 30/06 705/26.1 |
| 2015/0186226 | A1* | 7/2015 | Oppermann | G06F 3/0617 714/6.23 |
| 2015/0281059 | A1* | 10/2015 | Xiao | H04L 45/74 709/238 |
| 2015/0281060 | A1* | 10/2015 | Xiao | H04L 45/74 709/238 |
| 2016/0088092 | A1* | 3/2016 | Cardona-Gonzalez | H04L 67/141 709/227 |
| 2016/0103699 | A1* | 4/2016 | Thakkar | G06F 9/45558 718/1 |

OTHER PUBLICATIONS

ETSI "Network Functions Virtualisation (NFV); Architectural Framework"; ETSI GS NFV 002 V1.1.1; Oct. 2013; pp. 1-21; Network Functions Virtualisation (NFV) ETSI Industry Specification Group; Sophia Antipolis Cedex, France.
Office Action issued in corresponding EP Application No. 15701490.3 dated Feb. 4, 2019, 08 Pages. The references cited herein have previously been made of record.
Office Action issued in corresponding EP Application No. 15701490.3 dated Sep. 26, 2019, 06 Pages.
Office Action issued in corresponding EP Application No. 15701490.3 dated Apr. 24, 2020, 05 Pages.

* cited by examiner

Fig. 7
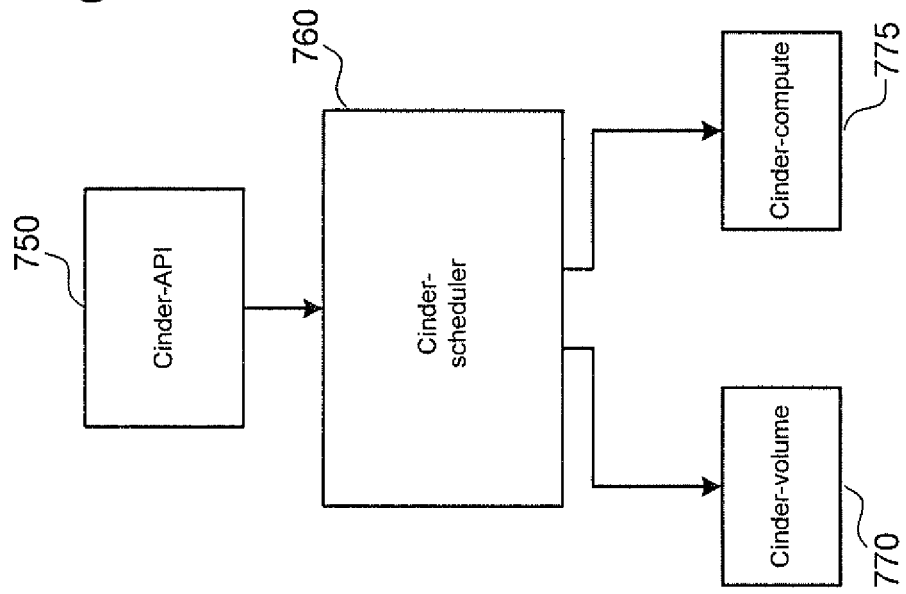
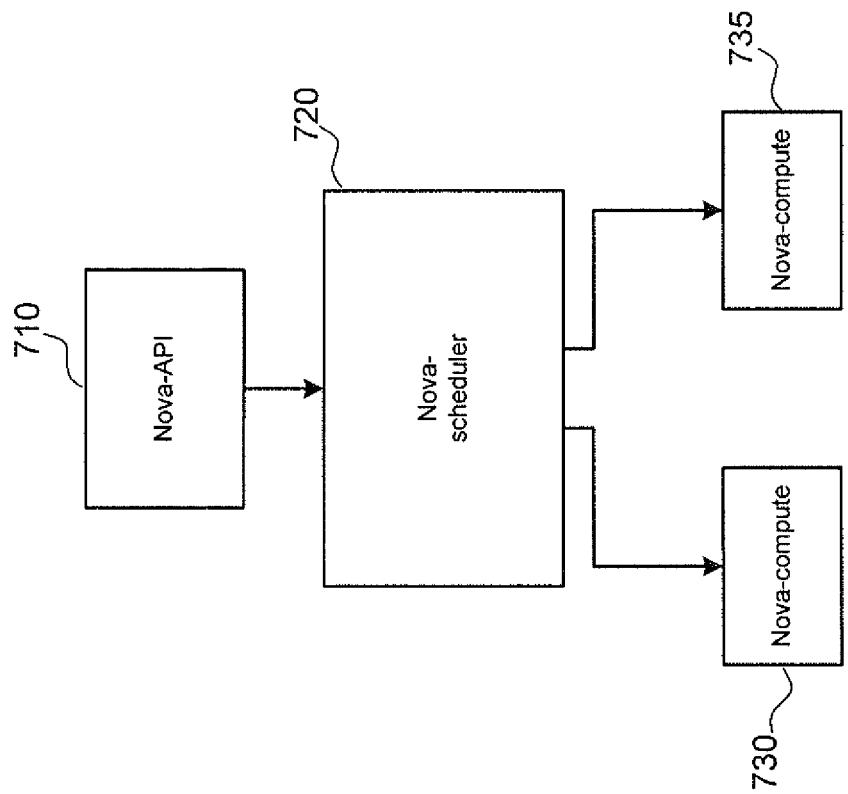

STORAGE FAST PATH

CROSS-REFERENCE TO RELATED APPLICATION

This application is a U.S. National Stage Filing under 35 U.S.C. § 371 of International Application No. PCT/EP2015/050650, filed on Jan. 15, 2015, the disclosure of which is fully incorporated herein by reference.

TECHNICAL FIELD

The present invention relates in general to controlling resources, more specifically to controlling resources in a cloud environment, and in particular, to controlling a compute resource and a storage resource in a system including a compute component, a storage component, and at least one host in a cloud environment. More in detail, the present invention related to a method for controlling resources, a component entity, a system, a computer program and a signal.

BACKGROUND

By cloud computing reference is made to a type of computing which abstracts from physical compute, network, and storage resources and provides shared access to virtual compute, network and storage resources in a datacenter. The components thereof are (typically) connected by means of a network. Using other words, cloud computing can be said to refer to a model for enabling ubiquitous, convenient, on-demand network access to a shared pool of configurable resources (including any or a combination of servers, networks, storage, applications, services), that can be rapidly provisioned and released with minimal efforts or service producer interaction.

A part of a cloud infrastructure is storage. Most of the virtual machines require storage in order to execute. Storage space can be provided by mainly two different ways: from a centralized storage array or distributed across all the compute blades that have some storage capacity. Virtualization provides abstracted access to compute resources (CPU, main memory), networking, and storage. In the following, with virtual machine reference is made to the (virtualized) compute resources; thus, creating a virtual machine refers to deploying or allocating the compute resource(s), to which storage and networking resources can be added (or associated or connected) on demand.

One common deployment offers a solution in between: each host with storage capacity (storage disks) will provide that storage to any virtual machine in the cloud infrastructure. However, each host is independent of the rest and therefore one should think about this architecture as multiple centralized storage solutions and not as distributed storage (e.g. parts of the same file will not be distributed across the hosts).

An example of a storage architecture of the hosts is depicted in FIG. 8. An abstraction layer (e.g. LVM 840) logically merges all the physical storage capacity of the different local disks 850, 855 into one logical pool. From this logical pool, logical volumes (e.g. 820 in FIG. 8) can be created. These volumes are offered to other hosts (or to VM(s) running on the local compute host) via an iSCSI server. Therefore, an iSCSI server and an iSCSI client always run inside the host. iSCSI is a protocol that enables clients (initiators) to communicate with storage devices (targets) over a network. It encapsulates standard SCSI commands in network packets, thereby making remote storage devices appear as local block storage devices at the clients To orchestrate and manage the cloud infrastructure, OpenStack can be used. OpenStack is a cloud operating system or architecture that controls large pools of compute, storage, and networking resources throughout a datacenter. It comprises multiple components which manage specific system components or system areas. In particular, Nova manages the compute resources whereas Cinder manages the storage resources.

More specifically, the Nova component of Openstack is responsible for managing the life cycle of virtual machines. It includes several subcomponents like: nova-api, nova-scheduler, and nova-compute.

The Cinder component of Openstack is responsible for managing the life cycle of block storage volumes. It consists of several subcomponents including: cinder-api, cinder-scheduler, cinder-volume.

FIG. 7 shows an illustrative architecture of these two components. Generally, nova-API 710, nova-scheduler 720, cinder-API 750, and cinder-scheduler 760 can run in a centralized controller-type machine. Nova-compute 730, 735 runs as an agent in each of the hosts, and cinder-volume 770, 775, when taking into account the described storage solution, runs as an agent in each of the hosts with a storage capacity (a back-end). When deploying a virtual machine, the tenant would use the Nova API 710 to request computer resources (CPUs, memory, etc.), and the Cinder API 750 to request storage resources. The nova-scheduler 720 selects the best host and deploys the virtual machine using the respective nova-compute agent. The cinder-scheduler 760 selects the best back-end and, using the cinder-volume agent, creates the storage volume and connects it to the virtual machine using iSCSI.

More specifically, separating the management of compute and storage resources in different components of the OpenStack framework (Nova and Cinder) results in a separation of management operations and scheduling decisions. In particular, creating a virtual machine is independent from allocating the block storage volumes needed by this virtual machine—both in terms of the required front-end tools (Nova client and Cinder client) and the backend processing and scheduling operations (nova-scheduler/nova-compute and cinder-scheduler/cinder-volume).

Due to the independent management and scheduling operations of Nova and Cinder, virtual machines are likely to end up on different hosts than the allocated block storage. As a result, block storage must be exported via a network protocol to the remote virtual machines As an example, in order to provide an existing virtual machine with persistent block storage, three independent operations are necessary: boot the virtual machine using Nova ("nova boot"); allocate a block storage volume using Cinder ("cinder create"); attach the Cinder block storage volume to the virtual machine using Nova ("nova volume-attach"). In the second step, Cinder is not aware of the target virtual machine. Hence cinder-scheduler cannot determine the compute host of the target virtual machine and allocate the block storage on this host.

As a further example, in order to boot a virtual machine from a Cinder volume, two independent operations are necessary: create a Cinder volume from a glance image using Cinder ("cinder create"); boot the virtual machine from the created Cinder volume using a block device mapping using Nova ("nova boot"). The nova-scheduler does not and currently cannot take into account the compute host on which the block storage volume has been allocated in step 1.

In summary, a high percentage of cloud deployments use a very simple yet cost efficient storage back-end architecture: instead of a dedicated and expensive storage array, local disks in the compute hosts are used. As a result, each compute host acts as a small-scale storage back-end, typically comprising just two or three disks each.

This local storage is exported by means of a protocol, e.g., typically iSCSI, in order to enable remote hosts and virtual machines to consume the storage provided by a storage host. This intermediate protocol decouples the placement of virtual machines from the location of the storage hosts and enables virtual machine migration. Despite its flexibility, this architecture has two major drawbacks or problems as herein recognized.

First, all storage I/O operations are always encapsulated in a protocol and sent through the network stack, even if the physical storage and the consuming virtual machines are located on the same compute/storage host. This encapsulation increases the performance overhead in comparison to a direct exposure of local storage to a virtual machine through the hypervisor.

Second, compute and storage resources are handled independently in virtualized infrastructures. As a consequence of this inherent separation, the corresponding resource schedulers of the virtual infrastructure do not interact and hence do no optimize the placement of storage space and virtual machines with respect to each other. In particular, in the virtual infrastructure framework Openstack, placing a virtual machine on a compute host and allocating a block storage volume for this virtual machine are two completely independent resource scheduling operations. As a result, virtual machines and the corresponding allocated block storage volume are likely to end up on separate compute hosts, thereby increasing the performance overhead due to additional network traffic.

It is therefore desirable to provide an improved method, entity, and system, which overcome, or at least mitigate, the above-mentioned problems.

SUMMARY OF THE PRESENT INVENTION

The object is achieved by the subject-matter of the independent claims. Advantageous embodiments are defined in the dependent claims. Further examples are provided for facilitating the understanding of the invention.

According to a first aspect of the invention, it is provided a method for controlling a first resource and a second resource in a system including a first component, a second component and at least one host in a cloud environment, the at least one host hosting the second resource, the first resource being managed by the first component and the second resource being managed by the second component, wherein amongst the first component and second component one comprises a compute component and one comprises a storage component, amongst the first resource and second resource one is a compute resource and one is a storage resource, the method comprising the steps of: causing the first component to send an inquiry request to the second component, the inquiry request including an inquiry relating to the second resource; causing the second component to send an inquiry response to the first component, the inquiry response including information on the at least one host; causing the co-location of the first resource and the second resource on a single host on the basis of the inquiry response, the single host being one amongst said at least one host and a further host hosting the first resource.

According to a second aspect of the invention, it is provided a component entity for controlling at least one of a first resource and a second resource in a system including the component entity, a further component entity and at least one host in a cloud environment, the at least one host hosting the second resource, the first resource being managed by the component entity and the second resource being managed by the further component entity, wherein amongst the component entity and the further component entity one comprises a compute component entity and one comprises a storage component entity, amongst the first resource and second resource one is a compute resource and one is a storage resource, the component entity comprising: sending means configured to send an inquiry request to the further component entity, the inquiry request including an inquiry relating to the second resource; receiving means configured to receive an inquiry response from the further component entity, the inquiry response including information on the at least one host; co-location means configured to locate the first resource and the second resource on a single host on the basis of the inquiry response, the single host being one amongst said at least one host and a further host hosting the first resource.

According to a third aspect of the invention, it is provided a system, for controlling a first resource and a second resource, the system including a first component, a second component and at least one host in a cloud environment, wherein at least one of the first and second component includes an entity according to the second aspect of the invention.

According to a fourth aspect of the invention, it is provided a system for controlling a first resource and a second resource, the system including a first component, a second component and at least one host in a cloud environment, the at least one host hosting the second resource, the first resource being managed by the first component and the second resource being managed by the second component, wherein amongst the first component and second component one is a compute component and one is a storage component, amongst the first resource and second resource one is a compute resource and one is a storage resource; and wherein the first component is configured to send an inquiry request to the second component, the inquiry request including an inquiry relating to the second resource; the second component is configured to send an inquiry response to the first component, the inquiry response including information on the at least one host; at least one of the first component and the second component is configured to locate the first resource and, respectively, the second resource on a single host on the basis of the inquiry response, the single host being one amongst said at least one host and a further host hosting the first resource.

According to a fifth aspect of the invention, it is provided a program for controlling a first resource and a second resource in a system including a first component, a second component and at least one host in a cloud environment, the at least one host hosting the second resource, the first resource being managed by the first component and the second resource being managed by the second component, wherein amongst the first component and second component one comprises a compute component and one comprises a storage component, amongst the first resource and second resource one is a compute resource and one is a storage resource, the program configured to execute, when said program is executed on a computer, all the steps according to the method according to the first aspect of the invention.

According to a sixth aspect of the invention, it is provided a signal carrying a data structure, the signal exchanged between a first component (310) managing a first resource and a second component (320) managing a second resource, wherein the first component (310), the second component (329) and a host hosting the second resource are comprised in a cloud environment, wherein amongst the first component and second component one comprises a compute component and one comprises a storage component, and wherein amongst the first resource and second resource one is a compute resource and one is a storage resource. The data structure comprises information about co-location of the first resource and the second resource on a single host, the single host being one amongst said at least one host and a further host (340) hosting the first resource.

According to a seventh aspect of the invention, it is provided a method for controlling at least one of a first resource and a second resource in a system including a component entity, a further component entity and at least one host in a cloud environment, the at least one host hosting the second resource, the first resource being managed by the component entity and the second resource being managed by the further component entity, wherein amongst the component entity and the further component entity one comprises a compute component entity and one comprises a storage component entity, amongst the first resource and second resource one is a compute resource and one is a storage resource. The method according to this aspect comprises the steps of:

causing sending, at the component entity, of an inquiry request to the further component entity, the inquiry request including an inquiry relating to the second resource; causing receiving, at the component entity, of an inquiry response from the further component entity, the inquiry response including information on the at least one host; causing performing of co-location of the first resource and the second resource on a single host on the basis of the inquiry response, the single host being one amongst said at least one host and a further host (340) hosting the first resource.

BRIEF DESCRIPTION OF THE DRAWINGS

FIG. 7 illustrates an exemplary architecture of Nova and Cinder.

DETAILED DESCRIPTION

The present invention shall now be described in conjunction with specific embodiments by making reference to the drawings. It is however noted that these specific embodiments as well as the illustrative figures serve to provide the skilled person with a better understanding of the invention but are not intended to restrict in any way the scope of the invention which is defined by the independent claims.

Figure 1:
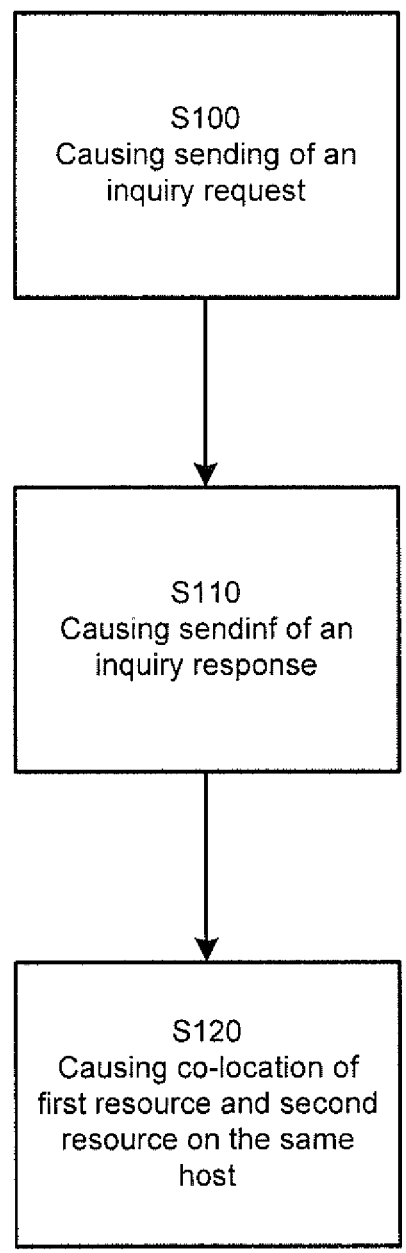
FIG. 1 illustrates a flow chart of a method according to a first embodiment of the present invention.

A method according to a first embodiment of the present invention will now be described with reference to FIG. 1. The method according to the first embodiment is for controlling a first resource and a second resource in a system like the one (300) of later described FIG. 3. The system includes a first component 310, a second component 320, and at least one host 330, and operates in a cloud environment. In this embodiment, the at least one host hosts the second resource, namely the second resource is allocated to the at least one host. The host may be a computer or a computing device (like a server, a server blade, etc. . . . ) connected to a computer network, and may include a compute host H and/or a storage host S. The host may manage tasks, communicate or execute instructions, deliver specific services to other networked computers or computing devices. Most often, the computer acting as a host allows the other computing devices to access and run specific software applications.

Figure 4:
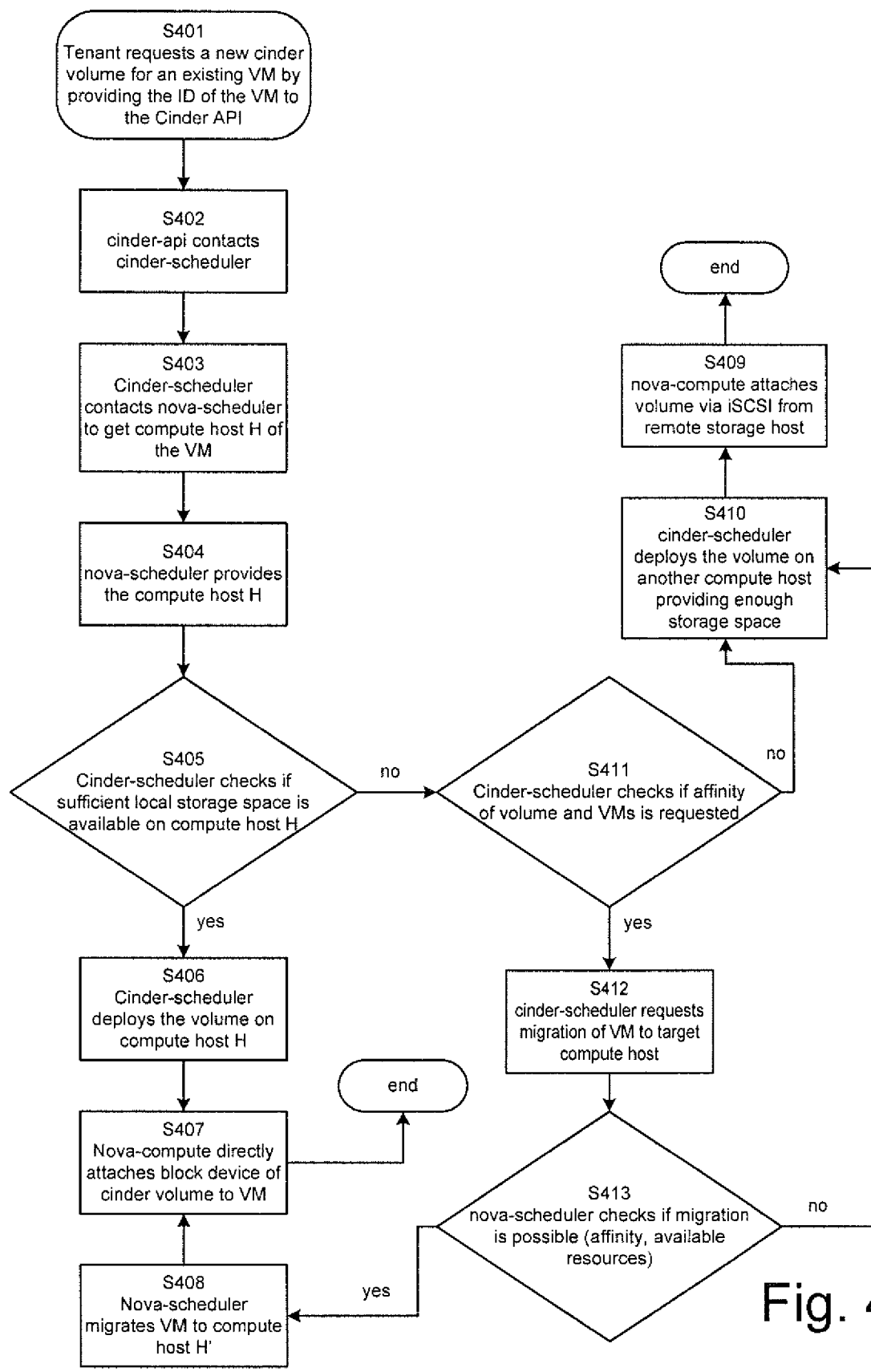
FIG. 4 illustrates a flow chart of a method according to an example of an implementation of the first embodiment.
Figure 5:
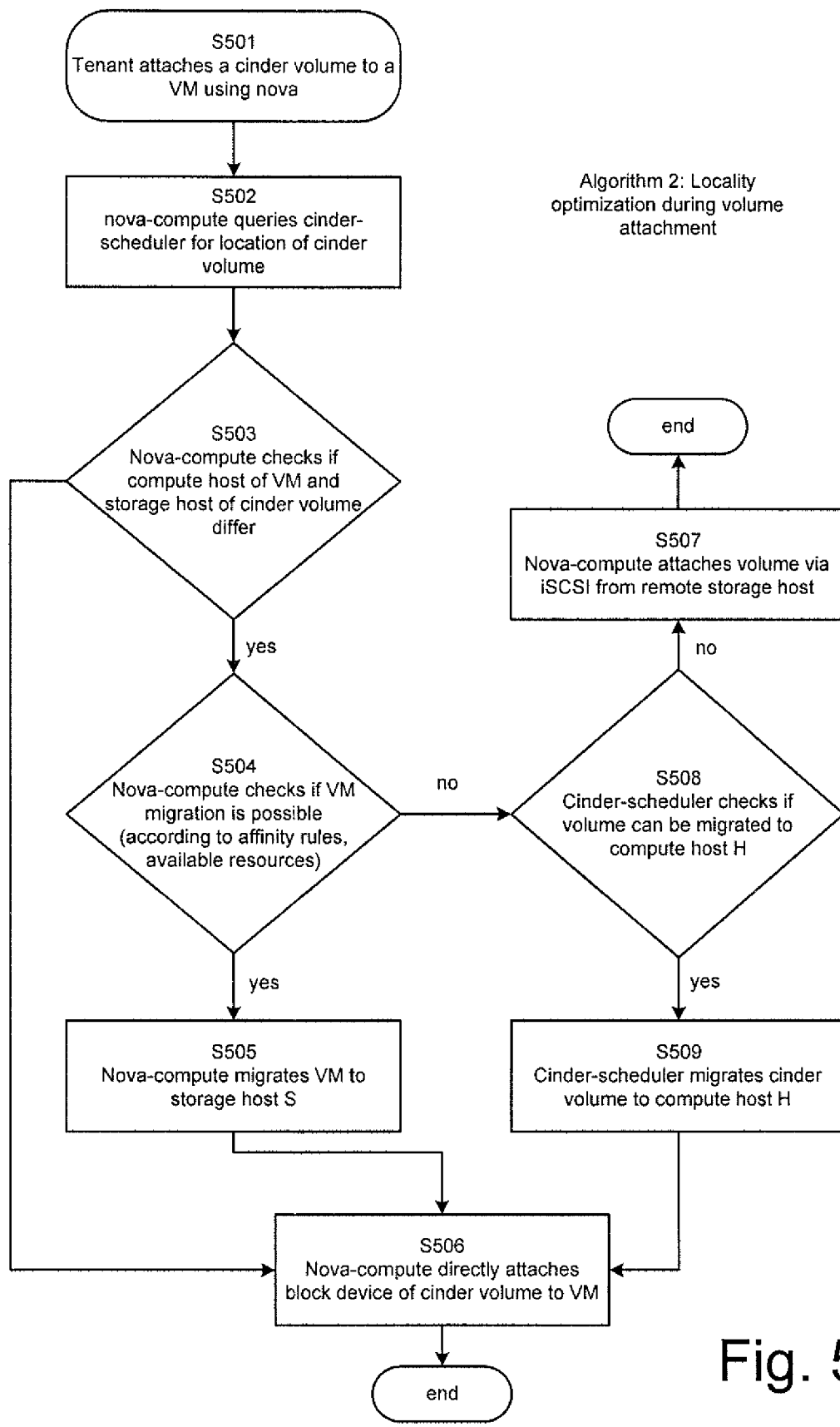
FIG. 5 illustrates a flow chart of a method according to an example of an implementation of the first embodiment.

In this context, the controlling refers to operations performed on the resources, and includes allocating a new resource to the host already hosting the other resource (see also the examples later described with reference to FIGS. 4 and 6) or reconfiguring one of the two resources so as that both are hosted on the same host (see also the example later described with reference to FIG. 5).

The first resource is managed by the first component and the second resource is managed by the second component. Amongst the first component and second component one comprises a compute component and one comprises a storage component, namely one includes a computer component and the other a storage component. In one example also later described, the first and second components may be Nova and Cinder, respectively, or a entity included in Nova and Cinder, respectively, or a corresponding entity including Nova and Cinder, respectively (the invention is however not limited to Cinder and Nova, since other components could be used as long as they are capable of handling compute and/or storage resources). Amongst the first resource and second resource one is a compute resource and one is a storage resource, namely one includes a compute resource and the other is a storage resource. In one example, the compute resource may be a resource capable of handling or executing a virtual machine, and the storage resource may be a block storage volume, for instance a Cinder volume. In one example, when the first component includes the storage component, the first resource includes the storage resource. In this example, the second component includes a compute component and the second resource includes a compute resource.

The method comprises a step S100 of causing the first component to send an inquiry request to the second component, the inquiry request including an inquiry relating to the second resource. Here, the action of causing refers to a unit or software element within the first component that causes the sending (e.g. a processor or software module instructing the sending); it may also or alternatively refer to an external element or device causing (e.g. in the sense of triggering) the sending by the first component (e.g. a management device, a data center, a tenant, an administrator, instructing or initiating the sending).

In one example, the inquiry may be considered as a request or interrogation and may comprise an inquiry as to information for identifying the host hosting the second resource. The information for identifying the host may refer to an ID of the host, to its address, to information on its location, or information on its capability, e.g. the capability of the host to host another resource or on which it resources it is capable to handle. In general, the information for identifying the host may refer to information that enables other devices to determine and identify said host (for instance, the ID, address, etc. . . . of the host). The first component may directly contact the host (e.g. on the basis of its ID, address, etc. . . . ), and receive a response regarding whether the other resource can be hosted; or the second component may directly ask the host (e.g. because it has knowledge of the ID, address, etc. . . . ) and respond with the host's ID and/or its capability. Moreover, the second component may directly respond without interrogating the host, in case it already knows its capability (e.g. because it has cached such information).

The method further comprises a step S110 of causing the second component to send an inquiry response to the first component, the inquiry response including information on the at least one host. Such inquiry response is complementary to the inquiry request, namely it comprises for instance information on the host comprising host ID, and/or host address, and/or ID location, etc. In general, it comprises any information for locating or identifying a host.

The method further comprises a step S120 of causing the co-location of the first resource and the second resource on a single host on the basis of the inquiry response, the single host being one amongst said at least one host and a further host 340 hosting the first resource. Here, co-location of the first resource and the second resource on a single host comprises establishing a resource on the host where the other resource is established (see for example FIGS. 4 and 6) or reconfiguring one of the resources so that both are on the same host (see for example FIG. 5).

The co-location may be performed on the basis of whether the at least one host (already hosting the second resource) can accommodate also the first resource. More specifically, the inquiry response may include information on the capacity of the at least one host. Namely, once the first component receives the inquiry response including information on the at least one host, the first component may check whether the at least one host (already hosting the second resource) can accommodate also the first resource. As anticipated, however, the response may also or alternatively include information for identifying the host, such that the first component can ask the host whether it is capable of hosting the other resource in order to perform the co-location. With reference to the causing or steps S110, S120, the same considerations apply as shown with reference to step S100, in particular that the causing can be generated by a unit and/or software module within the respective device, or from an external device.

As a result, the first and the second components can jointly take scheduling decisions, thereby allowing the first and the second resources to be allocated on the same host. In one example, the first and the second components may include a coordination function (see 1025 and 1065 in FIG. 10, which will be explained in the following), which when executed is an example of correlating the placement or causing the co-location of compute and storage resources. More specifically, the coordination functions of each component may communicate with each other via an interface function (see for example interface 1080 in FIG. 10, also later described as an example of a function allowing the sending and receiving of inquiry and inquiry responses). The co-location of storage and compute resources on the same host results in a faster resource allocation (storage fast path), namely storage and compute resources are attached through a shorter and faster path with respect to the conventional art. In one example also later described, a block device of the cinder volume is directly attached to a virtual machine through the hypervisor and not via the protocol stack and the iSCSI protocol, so the I/O operations take a shorter and faster path. In fact, as recognized by the inventors, the encapsulation required by network protocols like iSCSI adds performance overhead; it is thus advantageous, departing from such commonly used solutions in order to place virtual machines and allocated storage on the same compute and storage host. In the illustrated example, thus, cinder-scheduler and the nova-scheduler are configured so as to communicate and so as to take a common decision regarding where to deploy the virtual machine and where to allocate block storage. By deploying the virtual machine reference is made to the deployment or instantiation of compute resource(s) for the creation or initialization of the virtual machine. Other resources like a storage resource can then also be associated to the VM.

According to an optional implementation of the first embodiment, the step of causing the first component to send an inquiry comprises causing to send an inquiry in response to a request to deploy or reconfigure at least one of the first resource and second resource.

According to a further optional implementation of the first embodiment, the method comprises a step of establishing a direct connection between the first resource and the second resource, the direct connection comprising a connection local to (or confined, within) the host. The direct connection refers for instance to a managing component managing the storage resources (e.g. a hypervisor) that accesses the block storage volume/device directly on (or locally to) the host and not through the network stack (e.g. via iSCSI). Possible direct block storage devices can be among others physical disks, logical LVM volumes, disk images.

According to a further optional implementation of the first embodiment, establishing a direct connection between the first resource and the second resource comprises establishing a physical correlation between the first resource and the second resource. Here, establishing a physical correlation means that the compute resource (for example Nova, and more specifically nova-compute) directly attaches the storage resource to the compute resource within (locally to) the same host without the need to resort to a network connection. In one example, nova-compute may directly attach the block device of the Cinder volume to the virtual machine, and not for instance via iSCSI.

According to a further optional implementation, the method of the first embodiment may further be applied in a case, wherein the first component comprises the storage component and the second component comprises the compute component, the first resource is the storage resource and the second resource is the compute resource. Moreover, the step of causing the co-location includes allocating a new storage resource on said at least one host on the basis of said inquiry response. The inquiry response includes information on the at least one host hosting the compute resource.

One example of this implementation of the first embodiment will now be described with reference to FIG. 4. FIG. 4 refers to the creation of a block storage volume for an existing virtual machine. In this example, a tenant intends to extend an existing virtual machine with an (additional) block storage volume (though the same considerations apply to the case of adding a storage volume for the first time). In this example, the existing virtual machine has been already deployed, in the sense that it was already created by allocating compute resource(s) to it; simultaneously, or thereafter, the VM may have been associated also to an (existing) storage resource. Hence, the tenant needs to perform two separate operations in a normal Openstack environment: first, the tenant creates a new block storage volume by means of Cinder. Second, the tenant attaches the new volumes to a specific virtual machine through Nova.

Based on the fact that the new block storage volume is intended for a specific virtual machine, the solution for this example is twofold: the interface of cinder-api is extended such that a "create"-command accepts an option for specifying the universal unique identifier (UUID) of the target virtual machine; a new scheduling algorithm, part of the coordination function (e.g. 1025 and 1065 in FIG. 10), is added to cinder-scheduler which aims at co-locating the new block storage volume with the target virtual machine. The algorithm is shown in block diagram Algorithm 1 illustrated in FIG. 4, which is described in the following. The scheduling algorithm is an illustrative example of an algorithm causing the co-location described in the first embodiment; thus, the coordination function is an example of a function causing such co-location (in the example, by means of the algorithm therein included).

First, at step S401, a tenant requests a new Cinder volume for an existing virtual machine by providing the ID of the virtual machine to the cinder-API (the ID does not need to be necessarily sent, in case it is already known to the device, e.g. because it has cached it, or because it can get the ID from another device, e.g. a database or register of those IDs). Next, at step S402, cinder-API contacts cinder-scheduler. At step S403, cinder-scheduler contacts nova-scheduler to get the compute host H of the virtual machine. Thus, step S403 represents an example of step S100 of figure (noting that step S403 can be caused by the tenant requesting a new Cinder volume, by an entity making a corresponding request or caused by a module, hardware and/or software, configured to cause such step). At step S404, nova-scheduler provides the compute host H. Thus, step S404 represents an example of step S110 of FIG. 1. Next, at step S405, cinder-scheduler checks if a sufficient local storage space is available on the compute host H. If it is determined at step S405 that sufficient local storage space is available on the compute host H, step S406 is performed. At step S406, cinder-scheduler deploys the volume on the compute host H. Thus, step S406 represents an example of step S120 of FIG. 1. Next, at step S407, nova-compute directly attaches the block device of Cinder volume to the virtual machine and the process ends. If it is determined at step S405 that there is no sufficient local storage space available on the compute host H, step S411 is performed. At step S411, cinder-scheduler checks if affinity of volume and virtual machines is requested.

Anti-affinity and affinity are rules specified by the user or by the cloud administrator that limit the scheduler options when taking decisions. This limitation is typically reasoned: for example, if an application is created out of a cluster of two virtual machines, it is desirable that each virtual machine ends up in a different compute host so that the crash of one host will only result in the crash of one virtual machine, but not in the crash of both virtual machines. In this example, an anti-affinity rule may be added to the Nova scheduler, the rule stating that these two virtual machines need always to be deployed in two different compute hosts. Affinity or anti-affinity rules may be present in both Nova and Cinder scheduler. In the flow charts illustrated herein (see e.g. FIGS. 1, 4 to 6), when migration of the virtual machine or migration of the volume is triggered, it may be checked that any affinity or anti-affinity rule is not broken. This will prevent the virtual machine or the volume to be migrated.

Further, if it is determined at step S411 that affinity of volume and virtual machines is requested, step S412 is performed. At step S412, cinder-scheduler requests migration of the virtual machine to target compute host. Next, at step S413, nova-scheduler checks if migration is impossible. If it is determined at step S413 that migration is possible, step S408 is performed. At step S408, nova-scheduler migrates the virtual machine to the compute host Ht. Thus, step S408 is a further example of causing the co-location of compute and storage resources. Next, step S407 is performed and the process ends. On the other hand, if it is determined at step S413 that migration is not possible, step S410 is performed. At step S410, cinder-scheduler deploys the volume on another compute host providing enough storage space. Next, at step S409, nova-compute attaches the volume via iSCSI from the remote storage host and the process ends.

On the other hand, if it is determined at step S411 that affinity of volume and virtual machines is not requested, steps S410 and S409 are performed, and then the process ends.

Figure 8:
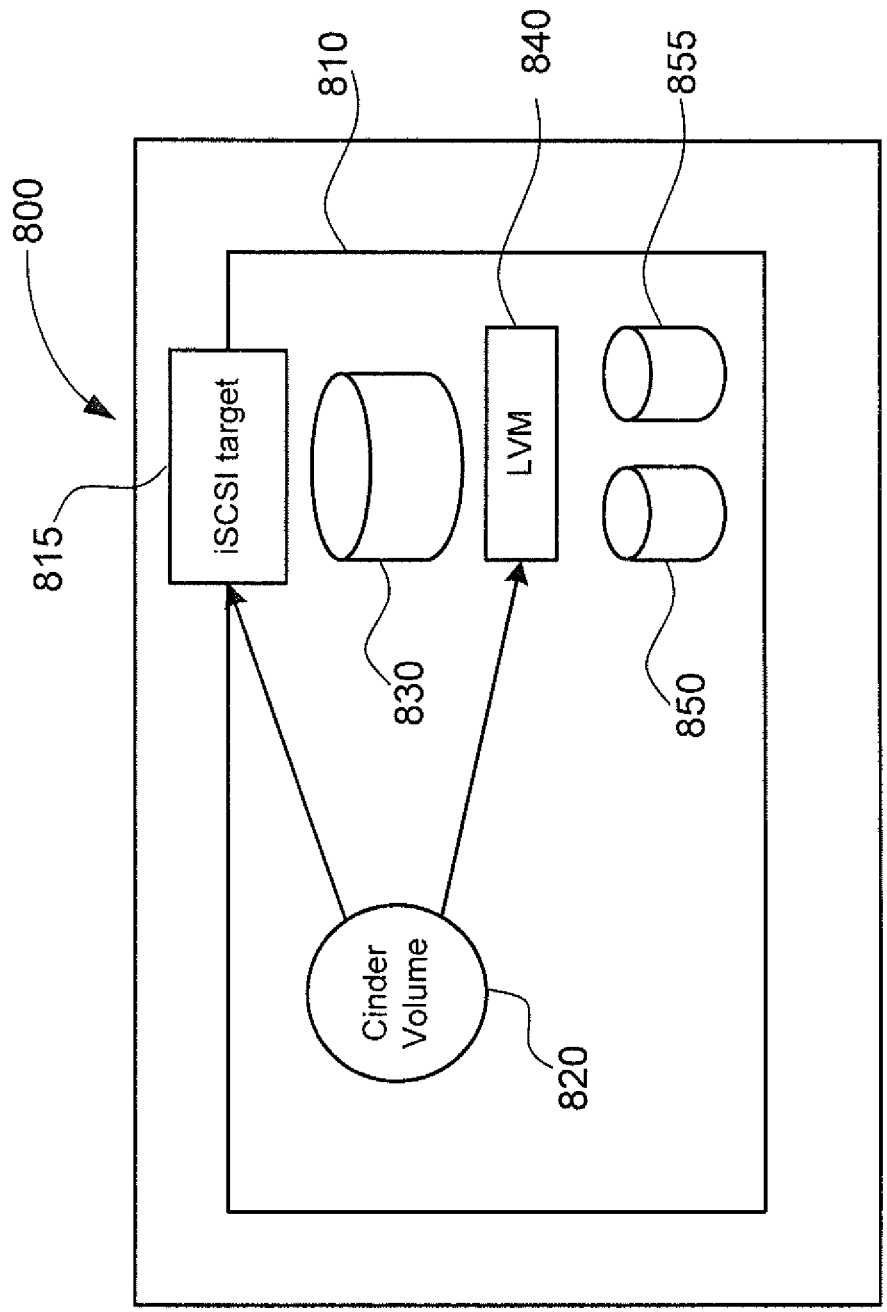
FIG. 8 illustrates an architecture showing how local storage is provided from a host.

After the coordination function (see e.g. 1025 and 1065 in FIG. 10) has finished the resource scheduling and allocation processes, nova-compute attaches the storage volumes to the corresponding virtual machines. This step represents an example of the step of establishing a physical correlation between resources as explained with reference to optional implementations of the first embodiment. In order to complete this operation, it utilizes volume connection information provided by Cinder specifying how nova-compute should access the block device (iSCSI, locally, Gluster, etc). In an Openstack environment without storage fast path, this typically corresponds to the iSCSI target IP and LUN (Logical Unit Number). As above illustrated, by fast storage path it is meant a direct connection (in the sense of a connection local to the host) between resources; for instance, in case of a direct attachment of a volume to a VM (i.e., directly through the hypervisor and not via the protocol stack and the iSCSI protocol), the I/O operations take a shorter and faster path, and therefore result in a fast path (in the sense of faster compared to a connection between resources via a network). As the coordination function is aware of the fact whether or not the storage volume and the target virtual machine are located on the same host, it can encode the connection information accordingly. Specifically, if storage volume and virtual machine are co-located, the connection information comprises the local LVM volume (e.g. 840 in FIG. 8) whereas it comprises the iSCSI target IP and LUN in case the storage volume and the virtual machine are not co-located. Nova-compute can transparently utilize the given information to either directly attach the storage volume or use a remote iSCSI connection.

According to an optional implementation, the method of the first embodiment may further be applied in a case, wherein the step of causing the co-location includes reconfiguring at least one of the first resource and the second resource, so that both of the first resource and the second resource are hosted on the single host. In this case, the inquiry response with the second host ID is useful at the first component having already knowledge of the first host ID. The component can then assess whether it can reconfigure its resource on the other host, or ask the other component to reconfigure its resource.

Here, reconfiguring may include reconfiguration of resources and reconfiguration of the attachment method or connection method. More in detail, reconfiguring a resource comprises reconfiguring its location from one host to another; for instance, either the compute resource or the storage resource may be migrated on the host hosting the other resource so that both resources are located on the same host. Moreover, reconfiguring the attachment method comprises reconfiguring the attachment or connection method from remote to direct or vice versa. For instance, when both resources are located on the same host, the connection between resources may be reconfigured from remote (e.g. via iSCSI) to direct (e.g. locally to the same host, without iSCSI). In a more specific example, the virtual machine or the block storage volume may be migrated so as to be co-located on the same host, and when they are co-located on the same host, the attachment method is reconfigured from remote to direct. Namely, when the resources are located on the same host, Nova may directly attach the block device to the virtual machine.

One example of this implementation of the first embodiment will now be described with reference to FIG. 5. In this example, a tenant intends to attach an existing block storage volume to an existing virtual machine. The block storage volume was previously not specifically created for the target VM. Hence, the VM and the block storage volume may be located on different compute hosts (similar considerations apply where the VM and/or block storage volume have been just created or initialized, or being in operation already since some time since their initialization).

Figure 10:
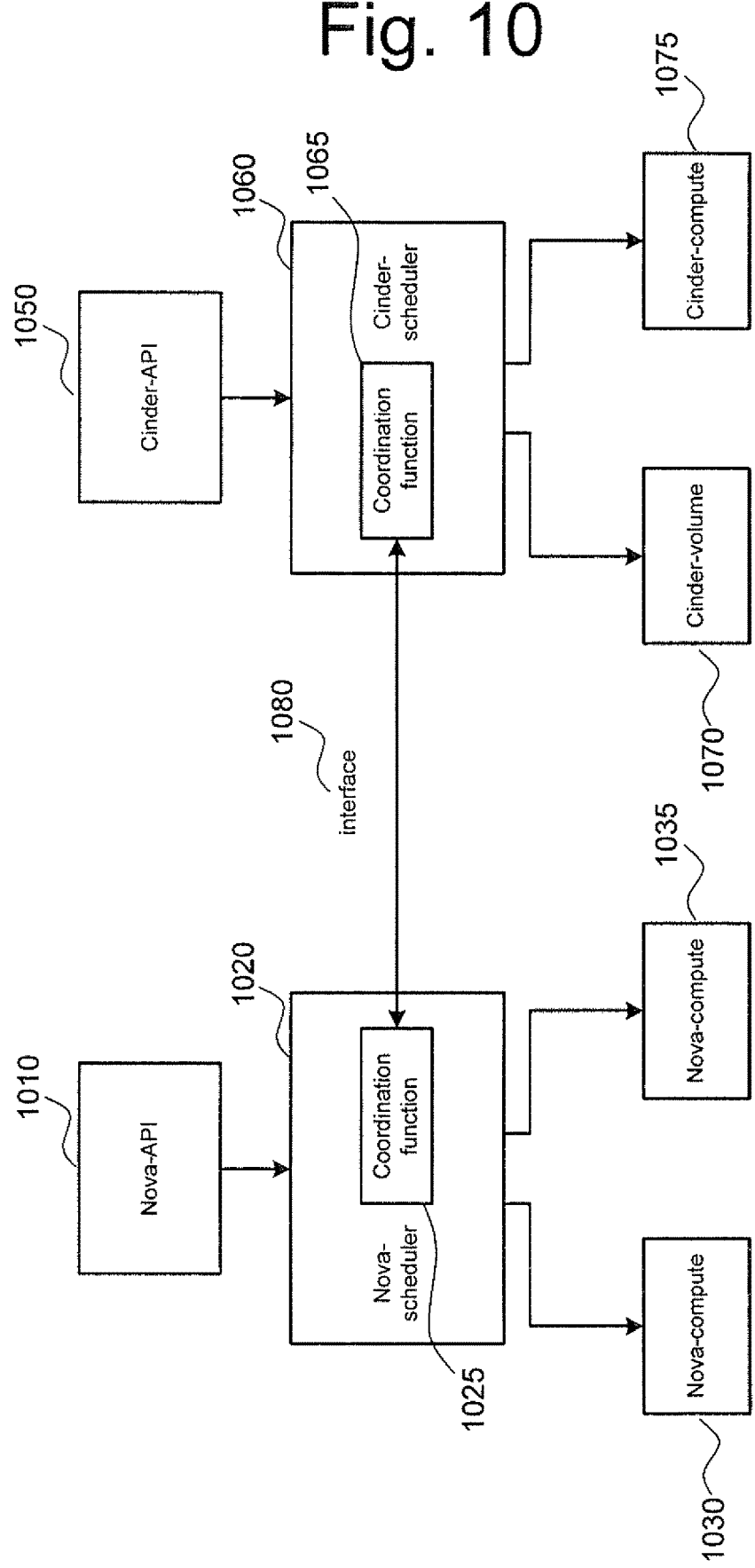
FIG. 10 illustrates an example of the present invention wherein the Nova and Cinder architecture are provided with an interface.
Figure 11:
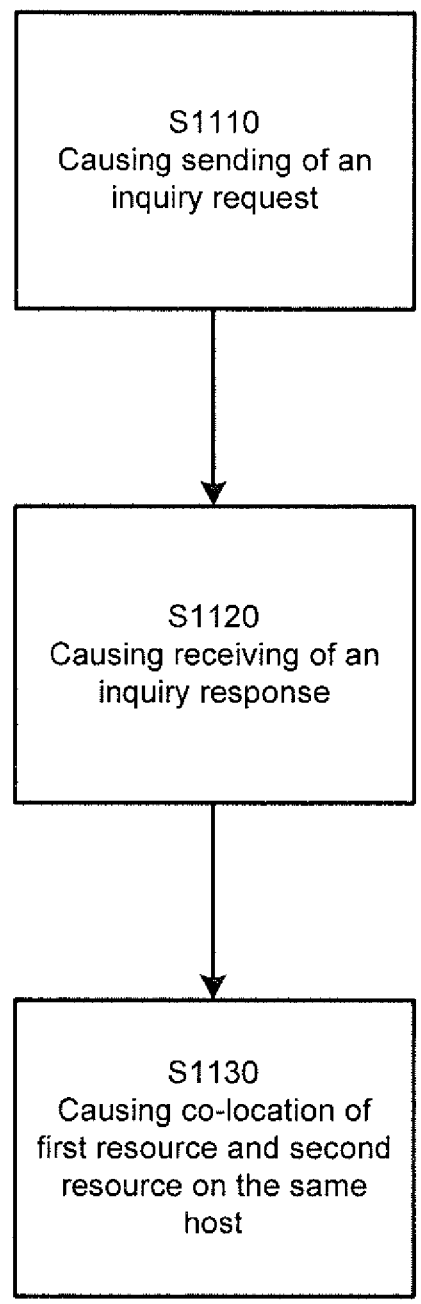
FIG. 11 illustrates a flow chart of a method according to a seventh embodiment of the present invention.

The solution for this example comprises co-locating the new block storage volume with the target virtual machine utilizing a new scheduling algorithm included in the new coordination function (1025, 1065 in FIG. 10). When considering a system based on a Cinder schedule, for the illustrative solution comprises a modified cinder-scheduler aiming at co-locating the new block storage volume with the target virtual machine. An illustrative example is shown in block diagram Algorithm 2 illustrated in FIG. 5, and is described in the following.

At step S501, a tenant attaches a Cinder volume to a virtual machine using nova (in a reconfiguration example, all resources have been already attached, i.e. are already in place). Next, at step S502, nova-compute queries cinder-scheduler for location of Cinder volume (note that this represents an example of step S110 above described, in that it requests for information relating to the storage resource). At step S503, nova-compute checks if compute host of virtual machine and storage host of Cinder volume differs (note that the step implicitly comprises or implies sending a response on the second host, i.e. on the host hosting the Cinder volume). If it is determined at step S503 that compute host of virtual machine and storage host of Cinder volume do not differ (i.e. both are already co-located), step S506 is performed. At step S506, nova-compute directly attaches block device of Cinder volume to virtual machine and the process ends. On the other hand, if it is determined at step S503 that compute host of virtual machine and storage host of Cinder volume differ (i.e. the resources are located on different hosts, or are not co-located), step S504 is performed. At step S504, nova-compute checks if virtual machine migration is possible. If it is determined at step S504 that virtual machine migration is possible, step S505 is performed. At step S505, nova-compute migrates the virtual machine to the storage host S (i.e. this migration is an example of co-location). Next, step S506 is performed and the process ends. If it is determined at step S504 that virtual machine migration is not possible, step S508 is performed. At step S508 cinder-scheduler checks if the volume can be migrated to the compute host H. If it is determined at step S508 that the volume cannot be migrated to the compute host H, step S507 is performed. At step S507, nova-compute attaches the volume via iSCSI from the remote storage host and the process ends. If it is determined at step S508 that the volume can be migrated to the compute host H, step S509 is performed. At step S509, cinder-scheduler migrates Cinder volume to the compute host H (i.e. this is a further example of co-location). Next, step S506 is performed and the process ends. Thus, the location of the resources can be reconfigured so as to obtain a co-location; in case instead the resources were already co-located, the attachment method can be changed from remote to direct.

According to an optional implementation, the method of the first embodiment may further be applied in a case, wherein the first component comprises the compute component and the second component comprises the storage component, the first resource is the compute resource and the second resource is the storage resource. Here, the storage resource might have been just created (or initialized), or may have been created and utilized since a long time. Moreover, the step of causing the co-location includes allocating a new compute resource on the at least said single host on the basis of said inquiry response including information on the at least one host hosting the storage resource.

Figure 6:
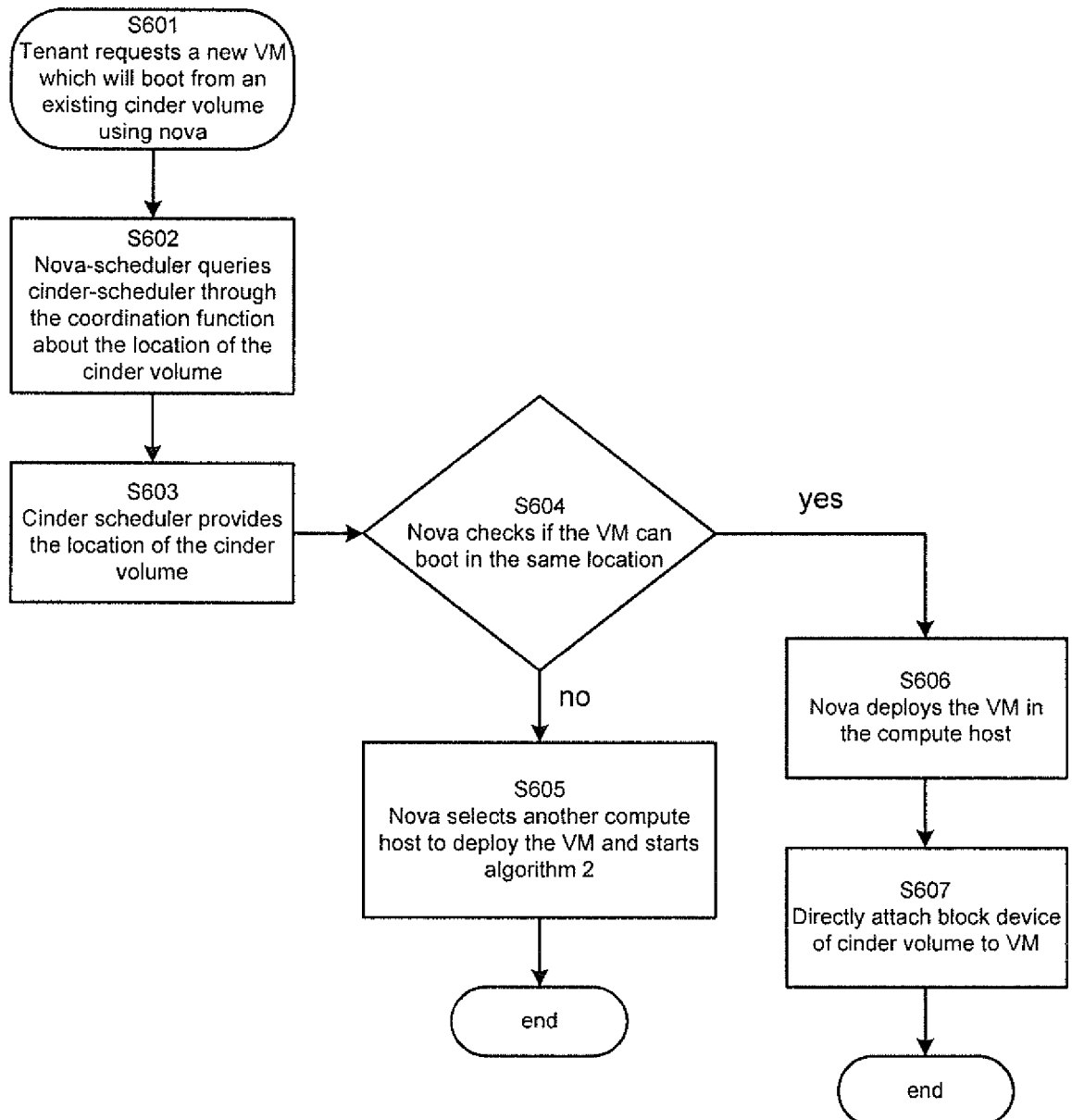
FIG. 6 illustrates a flow chart of a method according to an example of an implementation of the first embodiment.

One example of this implementation of the first embodiment will now be described with reference to FIG. 6. In this example, a tenant intends to create a block storage volume and boot a virtual machine from it. This involves two steps in a normal Openstack environment: a first step includes creating a volume from a Glance image by means of Cinder (Glance is an Openstack image service which provides discovery, registration, and delivery services). A second step includes booting the virtual machine from the block storage volume through Nova.

An illustrative solution for this scenario comprises a new scheduling algorithm causing the co-location of the new block storage with the target virtual machine, the scheduling being optionally (in this example) part of the new coordination function. Moreover, in the specific example, the algorithm and/or function can be included in a cinder-scheduler which aims at co-locating the new block storage volume with the target virtual machine. The algorithm is shown in block diagram Algorithm 3 illustrated in FIG. 6, and is described in the following.

At step S601, a tenant requests a new virtual machine which will boot from an existing Cinder volume using Nova. At step S602, nova-scheduler queries cinder-scheduler through the coordination function about the location of the Cinder volume (this represents an example of step S100 of FIG. 1, wherein the scheduler or an external device may be those causing the sending of the request). At step S603, cinder-scheduler provides the location of the Cinder volume (i.e. this steps represents an example of step S110 of FIG. 1). At step S604, Nova checks if the virtual machine can boot in the same location. If it is determined at step S604 that the virtual machine cannot boot in the same location, step S605 is performed. At step S605, Nova selects a nova-compute host to deploy virtual machine and starts algorithm 2 of FIG. 5. If it is determined at step S604 that the virtual machine can boot in the same location, step S606 is performed. At step S606, Nova deploys the virtual machine in the compute host (i.e. it performs an example of co-location). Next, at step S607, the block device of the Cinder volume is directly attached to virtual machine. Though in this example the attachment is performed by Nova, the invention is not limited thereto.

Figure 2:
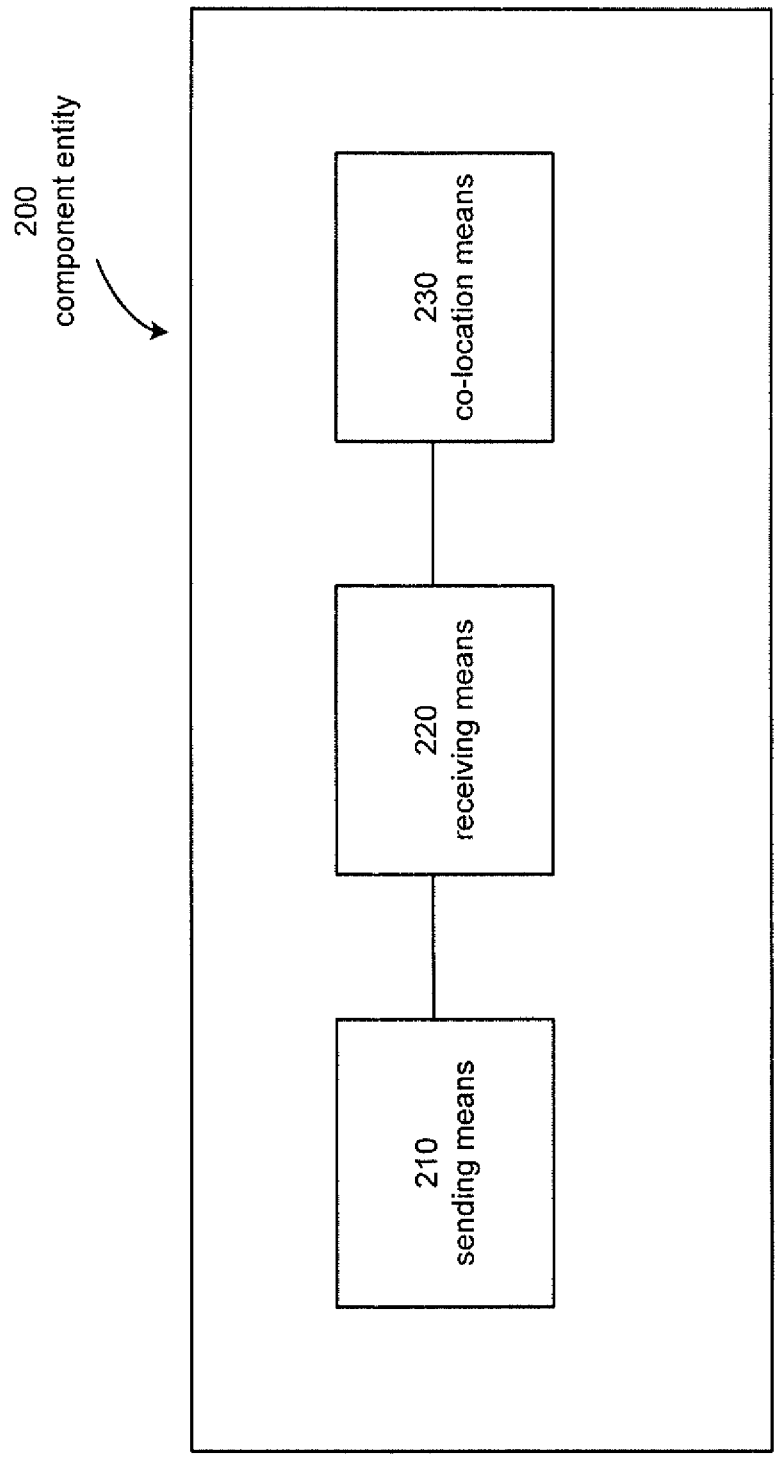
FIG. 2 illustrates a component entity according to a second embodiment of the present invention.

Next, a component entity according to a second embodiment of the present invention will be described with reference to FIG. 2. The component entity according to the second embodiment is for controlling at least one of a first resource and a second resource in a system including the component entity, a further component entity and at least one host in a cloud environment. In particular, the component entity may be a hardware and/or a software device, also distributed in different units. The component entity may be embodied by the new "coordination function" 1025 and/or 1065 of FIG. 10, or it may be the entire component including the "coordination function" 1025 and/or 1065. Moreover, the connections shown between the blocks comprised in the entity are only illustrative; in fact, other connections are also possible, e.g. over a bus. The discussion relative to the method according to the first embodiment applies also to the component entity according to the second embodiment, and will be therefore omitted.

As described in the above, the at least one host hosts the second resource. Further, the first resource is managed by the component entity and the second resource is managed by the further component entity. Amongst the component entity and the further component entity one comprises a compute component entity and one comprises a storage component entity. Further, amongst the first resource and second resource one is a compute resource and one is a storage resource.

The component entity comprises sending means 210 configured to send an inquiry request to the further component entity. The inquiry request includes an inquiry relating to the second resource. In one example, the sending means may be substituted by a sending component configured to send.

The component entity further comprises receiving means 220 configured to receive an inquiry response from the further component entity, wherein the inquiry response includes information on the at least one host. In one example, the receiving means may be substituted by a receiving component configured to receive.

Moreover, the component entity comprises co-location means 230 configured to locate the first resource and the second resource on a single host on the basis of the inquiry response. The single host is one amongst said at least one host and a further host hosting the first resource. In one example, the co-location means may be substituted by a co-location component configured to perform co-location of resources.

According to an optional implementation of the second embodiment, the sending means are further configured to send an inquiry in response to a request to deploy, i.e. allocate, or reconfigure at least one of the first resource and second resource.

According to a further optional implementation of the second embodiment, the component entity according to the first embodiment further comprises correlation means configured to establish a physical correlation between the first resource and the second resource.

According to another optional implementation of the second embodiment, the component entity comprises the storage component and the further component entity comprises the compute component. This implementation of the second embodiment may correspond to the method of the first embodiment described in relation to FIG. 4. Here, the first resource is the storage resource and the second resource is the compute resource. In addition, the co-location means is further configured to allocate a new storage resource on said at least one host on the basis of said inquiry response including information on the at least one host hosting the compute resource.

According to a further optional implementation of the second embodiment, in the component entity according to the first embodiment, the co-location means is adapted to reconfigure at least one of the first resource and the second resource, so that both of the first resource and the second resource are hosted on said single host. This implementation of the second embodiment may correspond to the method of the first embodiment described in relation to FIG. 5.

Figure 12:
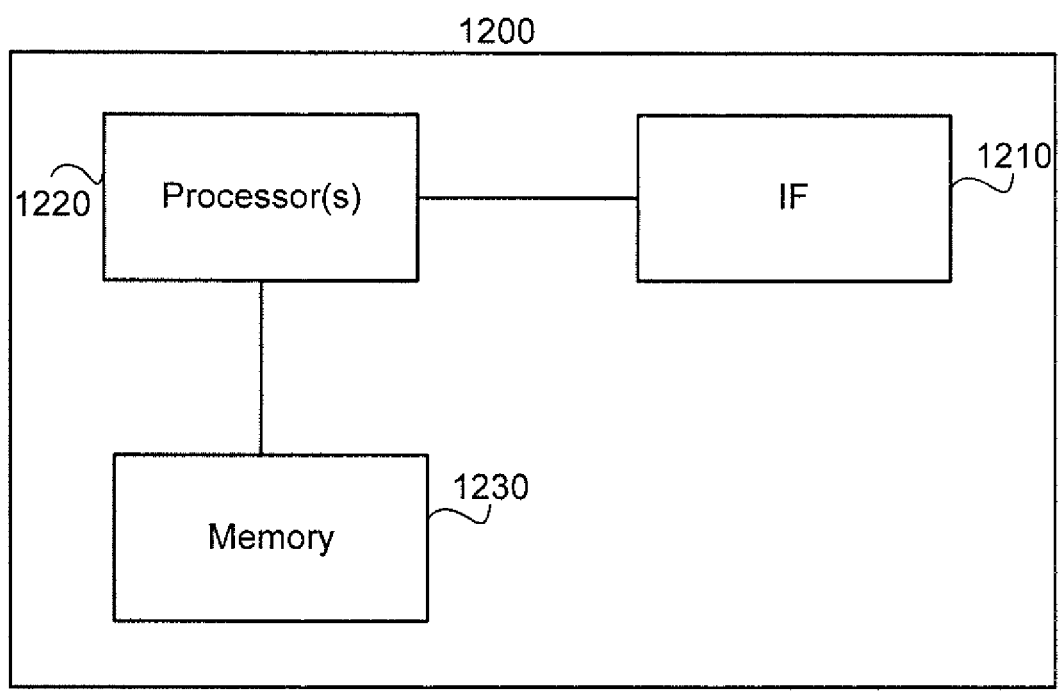
FIG. 12 illustrates an illustrating arrangement capable of performing any of the method steps described herein.

According to another optional implementation of the second embodiment, the component entity comprises the compute component and the further component entity comprises the storage component. Here, the first resource is the compute resource and the second resource is the storage resource. In addition, the co-location means is further configured to allocate a new compute resource on the at least the single host on the basis of the inquiry response including information on the at least one host hosting the storage resource. This implementation of the second embodiment may correspond to the method of the first embodiment described in relation to FIG. 6. For example, the component entity may be implemented in an arrangement comprising one or more of: a processor or a micro processor, adequate software and memory for storing of the software, a Programmable Logic Device (PLD) or other electronic component(s) or processing circuitry configured to perform the actions described above, and illustrated, e.g., in FIG. 12. More in detail, FIG. 12 illustrates exemplary structure of such an arrangement. As illustrated, the arrangement may include an interface unit 1210 for communicating with one or more other arrangement, for instance over a network, and a processor (or multiple processors) 1220 for executing instructions. Moreover, the arrangement comprises a memory 1230 (or multiple memories, of any suitable kind) for storing the instructions and/or the data related to the instructions. The instructions can be represented by program code module(s). The memory 560 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. In one example, the processor, the memory and the interface are general hardware components, with instructions causing the arrangement to function according to the above method or according to the above component entity. In another example, the arrangements comprises one or more of customized processor, memory, and interface, which in combination with specific instructions cause the arrangement to function according to the above method or according to the above component entity.

It is to be understood that the structures as illustrated in FIG. 12 are merely schematic and that the arrangement may actually include further components which, for the sake of clarity, have not been illustrated, e.g., further interfaces or processors. Also, it is to be understood that the memory may include further types of instructions or program code modules, which have not been illustrated, e.g., program code modules for implementing known functionalities for instance of a server or of a network node. According to some embodiments, also a computer program may be provided for implementing functionalities of the entity (or corresponding steps of the method), e.g., in the form of a physical medium storing the program code and/or other data to be stored in the memory or by making the program code available for download or by streaming.

Figure 3:
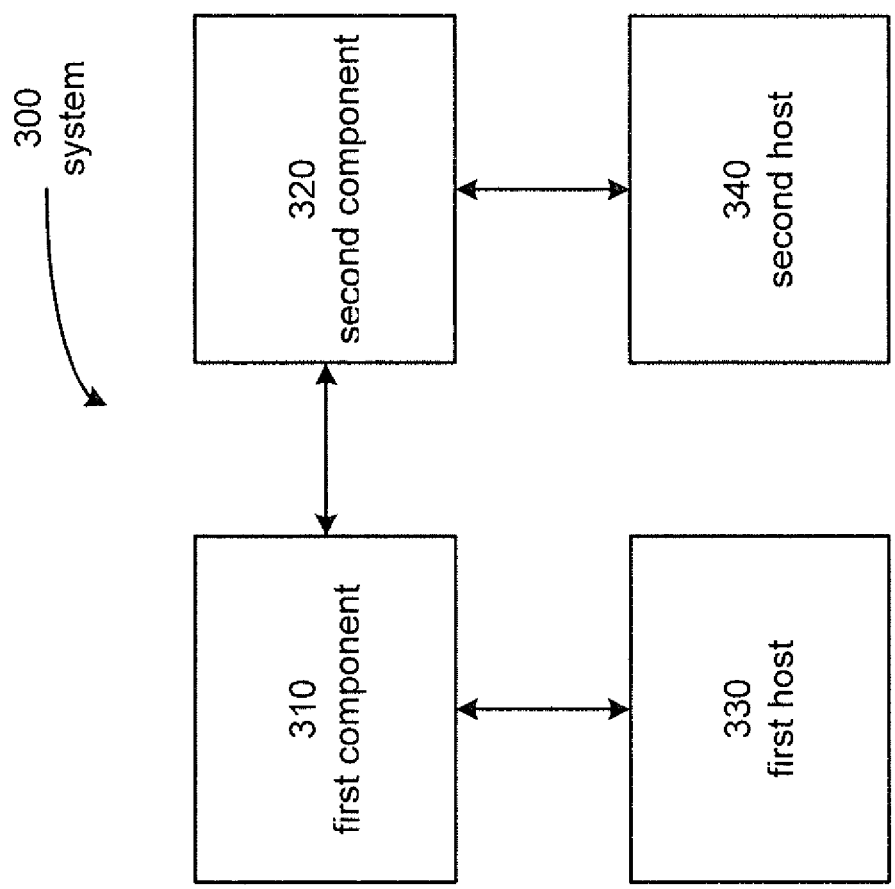
FIG. 3 illustrates a system according to a third and a fourth embodiment of the present invention.

Further, a system according to a third embodiment of the present invention will now be described with reference to FIG. 3. The system according to the third embodiment is for controlling a first resource and a second resource. The system 300 includes a first component 310, a second component 320 and at least one host 330 in a cloud environment. Here, at least one of the first and second components includes an entity according to the second embodiment described above.

Next, a system according to a fourth embodiment of the present invention will now be described with reference to FIG. 3. The system according to the fourth embodiment is for controlling a first resource and a second resource. The system 300 includes a first component 310, a second component 320 and at least one host 330 in a cloud environment. Here, the at least one host hosts the second resource. Moreover, the first resource is managed by the first component and the second resource is managed by the second component, wherein amongst the first component and second component one is a compute component and one is a storage component. Further, amongst the first resource and second resource one is a compute resource and one is a storage resource.

In the system according to the fourth embodiment, the first component is configured to send an inquiry request to the second component, wherein the inquiry request includes an inquiry relating to the second resource. Further, the second component is configured to send an inquiry response to the first component, wherein the inquiry response includes information on the at least one host. In addition, at least one of the first component and the second component is configured to locate the first resource and, respectively, the second resource on a single host on the basis of the inquiry response, the single host being one amongst said at least one host and a further host 340 hosting the first resource. Namely, one component may allocate the resource on the single host, or reconfigure it so that it is performed on the single host.

Further, a program according to a fifth embodiment of the present invention will now be described. The program according to the fifth embodiment is for controlling a first resource and a second resource in a system. The system 300 includes a first component 310, a second component 320 and at least one host 330 in a cloud environment. Here, the at least one host hosts the second resource. Moreover, the first resource is managed by the first component and the second resource is managed by the second component. Amongst the first component and second component one comprises a compute component and one comprises a storage component. Further, amongst the first resource and second resource one is a compute resource and one is a storage resource. The program configured to execute, when said program is executed on a computer, the steps according to the method according to the first embodiment and optionally its optional implementations.

Further, a signal carrying a data structure according to a sixth embodiment will now be described. The considerations made above also apply to the present embodiment, and are therefore omitted. Such signal is exchanged between a first component (310) managing a first resource and a second component (320) managing a second resource, wherein the first component (310), the second component (329) and a host hosting the second resource are comprised in a cloud environment. One of the first component and second component comprises a compute component and the other comprises a storage component. Moreover, one amongst the first resource and second resource is a compute resource and the other is a storage resource. The data structure comprises information about co-location of the first resource and the second resource on a single host, the single host being one amongst the at least one host and a further host (340) hosting the first resource. An example of the signal here described is provided by a signal carrying the "create"-command above illustrated. Moreover, an example of the signal is provided by the signal exchanged between Nova and Cinder as depicted in FIG. 10. Furthermore, the interface between Nova and Cinder (1080) can be embodied or included in the data structure carried by the signal.

Moreover, the data structures carried on the signal may optionally include at least one amongst information about an inquiry request including an inquiry relating to the second resource, and information about an inquiry response including information on the at least one host.

According to a seventh embodiment, it is provided a method for controlling at least one of a first resource and a second resource in a system (300) including a component entity (310), for which similar considerations as above apply and which are thus not repeated for conciseness. The method according to this embodiment illustrates the operation of one entity or of one coordination function within one entity. More in particular, the method comprises a step S1110 of causing sending, at the component entity, of an inquiry request to the further component entity, the inquiry request including an inquiry relating to the second resource. The causing can be the result of the operation of an hardware or software component within the entity, or can be the result of a command or of a request from an external unit triggering or initiating such sending. The method further comprises step S1120 of causing receiving, at the component entity, of an inquiry response from the further component entity, the inquiry response including information on the at least one host. Also here, causing the receiving can be the result of a command or request from an external unit, or from the internal operation of the device. Moreover, the method includes a step S1130 of causing performing of co-location of the first resource and the second resource on a single host on the basis of the inquiry response, the single host being one amongst said at least one host and a further host (340) hosting the first resource. For the "causing", similar considerations apply here as for steps S1110 and S1130.

Moreover, it is noted that the method can also be illustratively explained as comprising a step S1110 of sending the inquiry request, a step S1120 of receiving the inquiry response, and step S1130 of performing co-location, with all remaining considerations applying as made above.

In summary and in illustrative words, it is hereby introduced a new coordination function (or control function) that correlates the placement of compute and storage resources in a cloud environment. This is done in a way to ensure that storage resources are provisioned to the same compute host as virtual machines using these. Further, it can re-configure virtual machines, e.g., migrate or attach them to storage, via the interface, e, g, a compute controller interface, in order to enable placement of storage and compute on the same host.

The coordination function is located in both the storage controller and the compute controller in the cloud environment, e.g., a Cinder and Nova Scheduler when using for example OpenStack (see. g. 1025 and 1065 in FIG. 10). These sub-components of the new co-ordination function communicate with each other and the corresponding compute and storage schedulers via new interface functions (e.g. 1080). The new interface function in this example is the function responsible for exchanging inquiry and inquiry response messages. The new interface allows requesting information on the placement of virtual machines and storage volumes from the compute and storage controllers. This information is used to decide where to provision storage volumes and where to create and/or migrate virtual machines.

Figure 9:
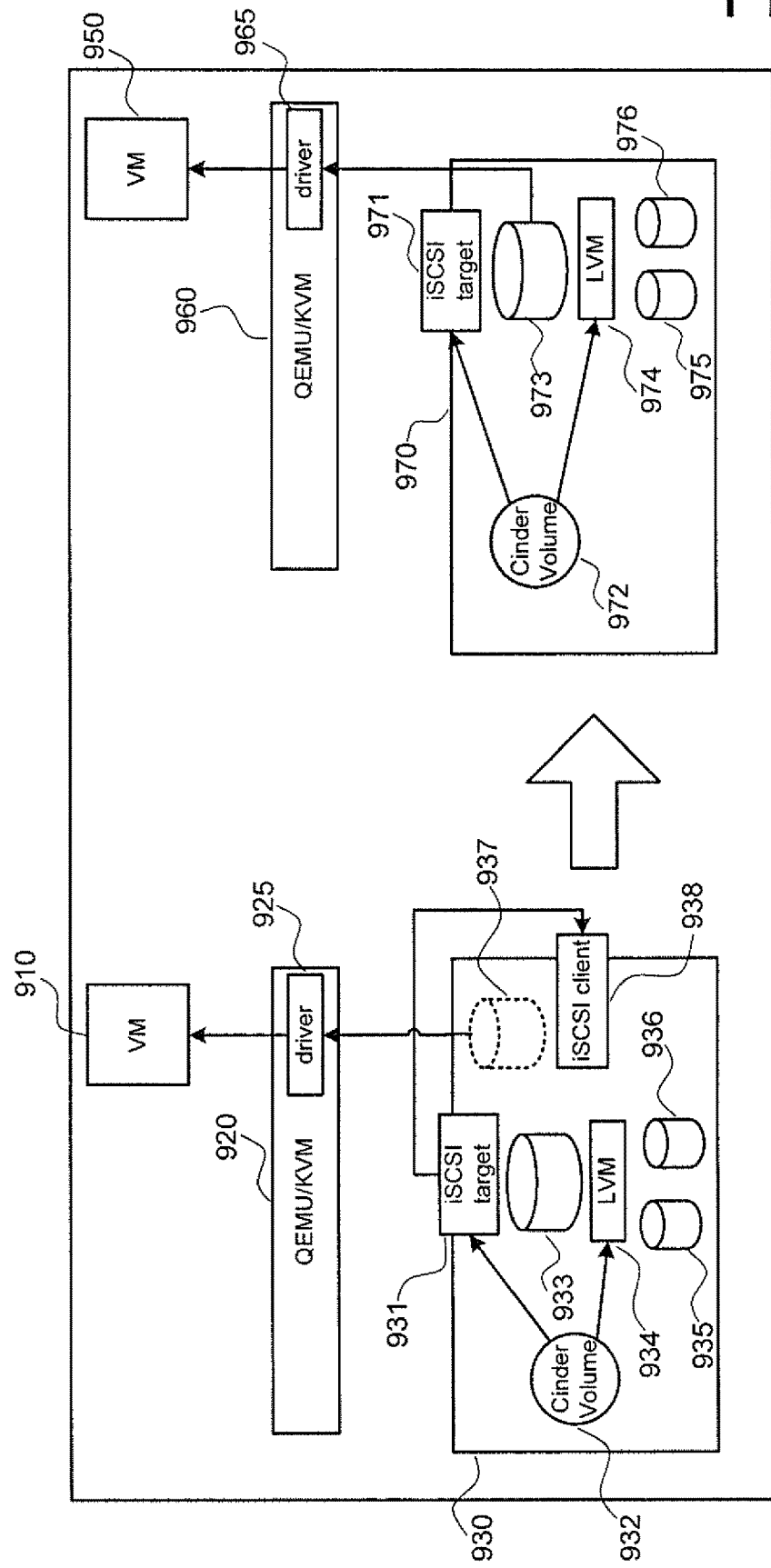
FIG. 9 illustrates an architecture when a storage is local.

The coordination function will also ensure that requests from compute controller and virtual machines will be amended with information to attach storage volumes to virtual machines via a fast path, e.g., without using iSCSI directly through the hypervisor, as shown in FIG. 9. Therein, it is in fact shown that instead of implementing iSCSI target/client, the VM can directly access the storage resource thanks to the co-location.

The present invention addresses and provides solutions to problems of current virtualized infrastructures including the problem of increased performance overhead due to always routing storage I/O through the network stack. Moreover, the invention allows for the presence of coordination between storage and compute resource schedulers, thus obviating at drawbacks.

The present invention enables the schedulers of Nova and Cinder to jointly take scheduling decisions. The main benefit of this joined scheduling effort is that virtual machines and locally allocated storage are placed on the same compute host with high probability. This in turn allows to attach virtual block storage volumes to virtual machines directly via the hypervisor instead of through the networking stack. Specifically, a direct attachment provides, amongst others, the following benefits: lower latency by avoiding that data is encapsulated and decapsulated in network packets and sent through the local network stack; higher throughput by avoiding the fragmentation of large read- and write-operations into multiple network packets which need to be send through the local network stack; higher number of IOPS by avoiding the addition CPU overhead of handling read- and write operations in the network stack, lower load on the SAN by avoiding that data needs to be transferred through the network. This frees up resources in the SAN for other traffic.

The component entity is a component of the cloud environment adapted for controlling at least one resource, and may be implemented in hardware, software or any suitable combinations thereof. Moreover, the component entity may be implemented is a network node or device (like servers or parts thereof). In other examples, the component entity may be distributed over several network nodes or devices or may be comprised within a network node or device.

It will be apparent to those skilled in the art that various modifications and variations can be made in the entities, methods, systems, computer programs and signals of the invention as well as in the construction of this invention without departing from the scope or spirit of the invention.

The invention has been described in relation to particular embodiments and examples which are intended in all aspects to be illustrative rather than restrictive. Those skilled in the art will appreciate that many different combinations of hardware, software and firmware will be suitable for practicing the present invention.

Where the terms like sending unit, receiving unit and co-location unit are used herewith, no restriction is made regarding how distributed these units may be and regarding how gathered elements may be. That is, the constituent parts of a unit or element or entity may be distributed in different software or hardware components or devices for bringing about the intended function. A plurality of distinct elements may also be gathered for providing the intended functionalities.

Any one of the above-referred units of an entity, or an element, or a network device, or a network node, etc. . . . may be implemented in hardware, software, field-programmable gate array (FPGA), application-specific integrated circuit (ASICs), firmware or the like.

In further embodiments of the invention, any one of the above-mentioned and/or claimed parts like sending unit, receiving unit, co-location unit (this list being not exhaustive) may be replaced by corresponding sending, receiving or co-location means.

In further embodiments of the invention, any one of the above-described steps may be implemented using computer-readable instructions, for instance in the form of computer-understandable procedures, methods or the like, in any kind of computer languages, and/or in the form of embedded software on firmware, integrated circuits or the like.

Moreover, other implementations of the invention will be apparent to those skilled in the art from consideration of the specification and practice of the invention disclosed herein. It is intended that the specification and the examples be considered as exemplary only. To this end, it is to be understood that inventive aspects lie in less than all features of a single foregoing disclosed implementation or configuration. Thus, the true scope and spirit of the invention is indicated by the following claims.

The invention claimed is:

1. A method for controlling a first resource and a second resource in a system including a first component, a second component, and at least one host in a cloud environment; the at least one host hosting the second resource; the first resource being managed by the first component; the second resource being managed by the second component; wherein amongst the first component and the second component one comprises a compute component and the other comprises a storage component; and wherein amongst the first resource and the second resource one is a compute resource and the other is a storage resource; the method comprising:
   causing the first component to send an inquiry request to the second component, the inquiry request including an inquiry relating to the second resource;
   causing the second component to send an inquiry response to the first component, the inquiry response including a host address for identifying the at least one host; and
   causing a co-location of the first resource and the second resource on a single host based on the inquiry response, the single host being one amongst the at least one host and a further host hosting the first resource.

2. The method of claim 1, wherein the causing the first component to send the inquiry request comprises causing the first component to send the inquiry request in response to a request to deploy or reconfigure at least one of the first resource and the second resource.

3. The method of claim 1, further comprising establishing a direct connection between the first resource and the second resource, the direct connection comprising a connection local to the single host.

4. The method of claim 3, wherein the direct connection comprises a physical correlation between the first resource and the second resource.

5. The method of claim 1:
wherein the first component comprises the storage component, and the second component comprises the compute component;
wherein the first resource is the storage resource, and the second resource is the compute resource; and
wherein the causing the co-location includes allocating a new storage resource on the at least one host based on the inquiry response including the host address for identifying the at least one host hosting the compute resource.

6. The method of claim 1, wherein the causing the co-location includes reconfiguring at least one of the first resource and the second resource so that both of the first resource and the second resource are hosted on the single host.

7. The method of claim 1:
wherein the first component comprises the compute component, and the second component comprises the storage component;
wherein the first resource is the compute resource, and the second resource is the storage resource; and
wherein the causing the co-location includes allocating a new compute resource on the at least one host on the basis of the inquiry response including the host address for identifying the at least one host hosting the storage resource.

8. A component entity for controlling at least one of a first resource and a second resource in a system including the component entity, a further component entity, and at least one host in a cloud environment; the at least one host hosting the second resource; the first resource being managed by the component entity; the second resource being managed by the further component entity; wherein amongst the component entity and the further component entity one comprises a compute component entity and the other comprises a storage component entity; and wherein amongst the first resource and the second resource one is a compute resource and the other is a storage resource; the component entity comprising:
processing circuitry; and
memory containing instructions executable by the processing circuitry whereby the component entity is operative to:
send an inquiry request to the further component entity, the inquiry request including an inquiry relating to the second resource;
receive an inquiry response from the further component entity, the inquiry response including a host address for identifying the at least one host; and
locate the first resource and the second resource on a single host based on the inquiry response, the single host being one amongst the at least one host and a further host hosting the first resource.

9. The component entity of claim 8, wherein the instructions are such that the component entity is operative to send the inquiry request in response to a request to deploy or reconfigure at least one of the first resource and the second resource.

10. The component entity of claim 8, wherein the instructions are such that the component entity is operative to establish a physical correlation between the first resource and the second resource.

11. The component entity of claim 8:
wherein the component entity comprises the storage component, and the further component entity comprises the compute component;
wherein the first resource is the storage resource, and the second resource is the compute resource; and
wherein the instructions are such that the component entity is operative to allocate a new storage resource on the at least one host based on the inquiry response including the host address for identifying the at least one host hosting the compute resource.

12. The component entity of claim 8, wherein the instructions are such that the component entity is operative to reconfigure at least one of the first resource and the second resource so that both of the first resource and the second resource are hosted on the single host.

13. The component entity of claim 8:
wherein the component entity comprises the compute component, and the further component entity comprises the storage component;
wherein the first resource is the compute resource, and the second resource is the storage resource; and
wherein the instructions are such that the component entity is operative to allocate a new compute resource on the at least one host based on the inquiry response including the host address for identifying the at least one host hosting the storage resource.

14. A system for controlling a first resource and a second resource, the system comprising:
a first component, a second component, and at least one host in a cloud environment, wherein the at least one host is composed of a hardware processor and a hardware memory; the at least one host hosting the second resource;
wherein the first component manages the first resource;
wherein the second component manages the second resource;
wherein amongst the first component and the second component one is a compute component and the other is a storage component;
wherein amongst the first resource and the second resource one is a compute resource and the other is a storage resource;
wherein the first component is configured to send an inquiry request to the second component, the inquiry request including an inquiry relating to the second resource;
wherein the second component is configured to send an inquiry response to the first component, the inquiry response including a host address for identifying the at least one host; and
wherein at least one of the first component and the second component is configured to locate the first resource and, respectively, the second resource on a single host based on the inquiry response, the single host being one amongst the at least one host and a further host hosting the first resource.

15. A non-transitory computer readable recording medium storing a computer program product for controlling a first resource and a second resource in a system including a first component, a second component, and at least one host in a cloud environment;
the at least one host hosting the second resource; the first resource being managed by the first component; the second resource being managed by the second component; wherein amongst the first component and the second component one comprises a compute component and the other comprises a storage component; and wherein amongst the first resource and the second resource one is a compute resource and the other is a storage resource, the computer program product comprising software instructions which, when run on processing circuitry of a component entity, cause the component entity to:

cause the first component to send an inquiry request to the second component, the inquiry request including an inquiry relating to the second resource;

cause the second component to send an inquiry response to the first component, the inquiry response including a host address for identifying the at least one host; and cause a co-location of the first resource and the second resource on a single host based on the inquiry response, the single host being one amongst the at least one host and a further host hosting the first resource.

* * * * *